Nov. 27, 1945.    M. E. ANDERSON    2,389,885
METHOD AND APPARATUS FOR STRAIGHTENING BLANKS
Filed Sept. 9, 1942

INVENTOR.
Martin E. Anderson
BY
E. C. Sanborn
Attorney

Patented Nov. 27, 1945

2,389,885

UNITED STATES PATENT OFFICE 2,389,885

METHOD AND APPARATUS FOR STRAIGHTENING BLANKS

Martin E. Anderson, Waterbury, Conn., assignor to The Bristol Company, Waterbury, Conn., a corporation of Connecticut Application September 9, 1942, Serial No. 457,706

8 Claims. (Cl. 153—32)

This invention relates to the straightening of blanks and bar stock, and more especially to a novel method and apparatus, adapted for operation in conjunction with standard production machines, whereby blank pieces may be rendered substantially straight before being subjected to threading or a similar operation.

It is a well known fact that in the machining of bar stock there is a tendency for blanks or other pieces formed from said stock to be curved or otherwise strained after the first or roughing cut has been taken. This is due to the relieving of stresses set up in the metal at the time of its original forming into bar stock, and is especially true of material having originally a hexagonal or other polygonal cross section. In the working of such stocks in screw machines, turret lathes, or similar machine tools, the curvature introduced after the first cut has been taken may be sufficient to disturb the alignment of the stock or blank to an extent that it will not be properly engaged by the succeeding tool in the cycle of operations, with the result that the stock, and possibly the machine, may be damaged. It is an object of this invention to provide a method and tool, readily applicable to production machinery and adapted to be brought into action upon the stock after the roughing cut is made, to remove the distortion or strain resulting from said cut, and to render the blank substantially straight for the succeeding operation in the cycle.

Figure 1:
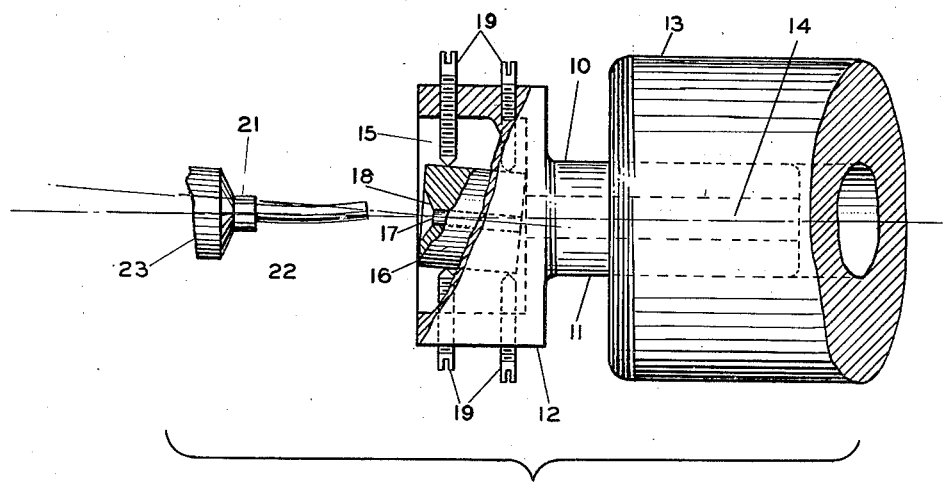
Fig. 1 is a side elevation, partly in section, of a tool embodying the principles of the invention.
Figure 2:
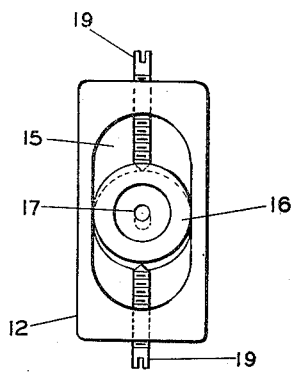
Fig. 2 is an end elevation of the same.

Referring now to the drawing: The numeral 10 designates a holder having a cylindrical portion or shank 11 formed at one end, and an enlarged head portion 12 at the end remote therefrom. The shank 11 is adapted to fit the turret or tailstock 13 of a lathe or screw machine, and to be secured therein in a conventional manner; and said shank is axially bored through with an opening 14 of sufficient size to clear the largest diameter of stock with which the device is to be used. The head portion 12 has formed therein a socket or recess 15 of width substantially greater than the diameter of the largest stock with which the device is to be used, and elongated in a sense perpendicular to the axis of the shank portion 11.

Positioned within the recess 15 is a cylindrical bushing 16 formed preferably of bronze or similar material, which in any case should be softer than the material of the blanks to be straightened, and having axially drilled therethrough an opening 17 of diameter somewhat greater than that of said blanks. The outer end of the bushing 16 is provided with a conically recessed portion 18, concentric with the opening 17 and serving as a countersink for guiding a blank into the opening 17. The bushing 16 is positioned in the recess 15 in such a manner that the axis of the opening 17 is not parallel to the center line of the shank portion 11, but is inclined thereto at an angle determined by experiment. The position of the bushing 16 is established by means of set screws 19 threaded through the end walls of the recess 15 and adapted to clamp said bushing securely in its selected skewed position. It has been found that the best operating position for the bushing 16 is attained when the center of the opening 17 where it merges into the countersink 18 lies upon the axis of the cylindrical shank portion 11.

When in use, the holder 10 is placed with its shank portion 11 secured in the conventional manner within the turret or tailstock 13 of the lathe by which the parts to be produced are being formed. One of said parts, as a blank 21, having a newly turned portion 22, is carried by the rotating spindle or chuck 23 in the headstock of said lathe, and presented to the opening 17 in the bushing 16 positioned in the recess 15. The tool comprising the holder 10 and the bushing 16 is then advanced axially toward the rotating blank, causing said blank first to be engaged by the countersink 18 and guided to the opening 17 and to enter the same. The material of the bushing 16 being softer than that of the blank 21, the latter is not subjected to any cutting or abrading action, and the whole effect of the tool upon the blank as the tool is forced axially along the blank and withdrawn is that of pressure progressively applied from all directions in a sense normal to the axis of rotation. By virtue of the skewed position of the bushing 16, the turned portion of the blank is subjected by the interior walls of said opening to a combined rotary and bending action, which removes strains previously existing in the blank, and which action, when the angular position of the bushing is properly adjusted by means of the set screws 19, leaves the blank substantially straight and concentric with its axis of rotation, so that it may safely be presented to a threading die or other tool to subject it to the following operation in the process of manufacture.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The method of straightening a bar stock blank to conform to a predetermined axis which comprises rotating said blank about said axis, forcing over said rotating blank along said axis an element having an extended opening therein, and subsequently withdrawing said element, the axis of said opening being at an angle with said axis of rotation, and the walls of said opening engaging the surface of said rotating blank during the relative axial travel between said blank and said element to effect straightening of said blank.

2. A tool for straightening a blank supported at one end in the rotating headstock of a lathe, comprising a holder adapted to be mounted in the tailstock of said lathe for longitudinal adjustment with respect to said headstock, and carrying an element bored with an axially extended opening, means cooperating with said element for maintaining the latter in a fixed position in said holder with the axis of said opening at an angle with the axis of said headstock, said holder together with said element being adapted to be axially advanced and withdrawn with respect to said blank while said blank is being rotated in engagement with the opening in said element.

3. A tool for straightening a blank supported at one end in the rotating headstock of a lathe, comprising a holder adapted to be mounted in the tailstock of said lathe for longitudinal adjustment with respect to said headstock, and carrying an element bored with an axially extended opening, means cooperating with said element for maintaining the latter in a fixed position in said holder with the axis of said opening at an angle with the axis of said headstock, and substantially intersecting the same, said holder together with said element being adapted to be axially advanced and withdrawn with respect to said blank while said blank is being rotated in engagement with the opening in said element.

4. A tool for straightening a blank supported at one end in the rotating headstock of a lathe, comprising a holder adapted to be mounted in the tailstock of said lathe for longitudinal adjustment with respect to said headstock, said holder having a recess therein, a bushing having an axially extended opening, means cooperating with said element for maintaining the latter in a fixed position within said recess with the axis of said opening lying at an angle with the axis of said headstock, said holder together with said bushing being adapted to be axially advanced and withdrawn with respect to said blank while said blank is being rotated in engagement with the opening in said element.

5. The method of straightening to conform to a predetermined axis a blank having a cylindrical section of finite length extending to one end thereof, comprising rotating said blank and applying to said blank during said rotation forces directed obliquely to said axis through the engagement of said blank with the walls of an extended opening in an element, the axis of said opening being at an angle with said axis of rotation, and producing relative movement between said element and said blank along said axis of rotation during rotation of said blank to move progressively the location of application of said forces along said axis from and toward said end of said blank.

6. A tool for straightening a blank supported at one end in the rotating headstock of a lathe, comprising a holder adapted to be mounted in the tailstock of said lathe for longitudinal adjustment with respect to said headstock, and carrying an element bored with an axially extended cylindrical opening, means cooperating with said element for maintaining the latter in a fixed position in said holder with the axis of said opening at an angle with the axis of said headstock, said holder together with said element being adapted to be axially advanced and withdrawn with respect to said blank while said blank is being rotated in engagement with the opening in said element.

7. The method of straightening a bar stock blank to conform to a predetermined axis which comprises rotating said blank about said axis, forcing over said rotating blank along said axis an element having an extended opening therein, and subsequently withdrawing said element, the axis of said opening being at an angle with said axis of rotation, and the walls of said opening engaging the surface of said rotating blank during the relative axial travel between said blank and said element to effect straightening of said blank, said element being of a material softer than that of said blank.

8. A tool for straightening a blank supported at one end in the rotating headstock of a lathe, comprising a holder adapted to be mounted in the tailstock of said lathe for longitudinal adjustment with respect to said headstock, and carrying an element bored with an axially extended opening, means cooperating with said element for maintaining the latter in a fixed position in said holder with the axis of said opening at an angle with the axis of said headstock, said holder together with said element being adapted to be axially advanced and withdrawn with respect to said blank while said blank is being rotated in engagement with the opening in said element, said element being of a material softer than that of the blank.

MARTIN E. ANDERSON.